United States Patent [19]
Wolff

[11] 3,785,227
[45] Jan. 15, 1974

[54] LATHE

[75] Inventor: Paul Wolff, Illkirch Graffenstaden, France

[73] Assignee: Compagnie Industrielle Des Telecommunications Cit-Alcatel, Paris, France

[22] Filed: Oct. 14, 1971

[21] Appl. No.: 189,421

[30] Foreign Application Priority Data
Oct. 14, 1970 France .................... 7037161

[52] U.S. Cl. .................... 82/2, 82/28, 82/31, 82/32, 82/34
[51] Int. Cl. ..... B23b 3/00, B23b 19/02, B23b 17/00
[58] Field of Search .............. 82/1, 2, 32, 21, 82/2.5, 30, 31, 11, 34, 28, 29

[56] References Cited
UNITED STATES PATENTS

| | | | |
|---|---|---|---|
| 3,124,985 | 3/1964 | Curtis et al. | 82/2 R |
| 3,011,373 | 12/1961 | Waldrich | 82/32 R |
| 2,546,687 | 3/1951 | Brandenburg | 82/32 R |
| 2,255,739 | 9/1941 | Curtis | 82/21 R X |
| 1,528,971 | 3/1925 | Groene | 82/2 R |
| 3,600,987 | 8/1971 | Kuanskka | 82/1 R |
| 3,372,613 | 3/1968 | Feld | 82/24 |
| 3,332,458 | 7/1967 | Baldwin | 82/32 R X |
| 2,010,557 | 8/1935 | Nenninger et al. | 82/32 R X |

FOREIGN PATENTS OR APPLICATIONS

| | | | |
|---|---|---|---|
| 964,425 | 7/1964 | Great Britain | 82/32 |
| 262,032 | 9/1949 | Switzerland | 82/32 |
| 644,182 | 4/1937 | Germany | 82/32 |

*Primary Examiner*—Harrison L. Hinson
*Attorney*—Sughrue, Rothwell, Mion, Zinn & Macpeak

[57] ABSTRACT

A lathe has a bedplate to which is mounted a lathe bed defining first and second slideways and a fixed headstock holding a rotatable spindle. A movable tailstock slides on at least one of the slideways such that the spindle axis lies in a first plane and the first and second slideways lie in a common second plane perpendicular to the first plane and equally spaced therefrom.

21 Claims, 6 Drawing Figures

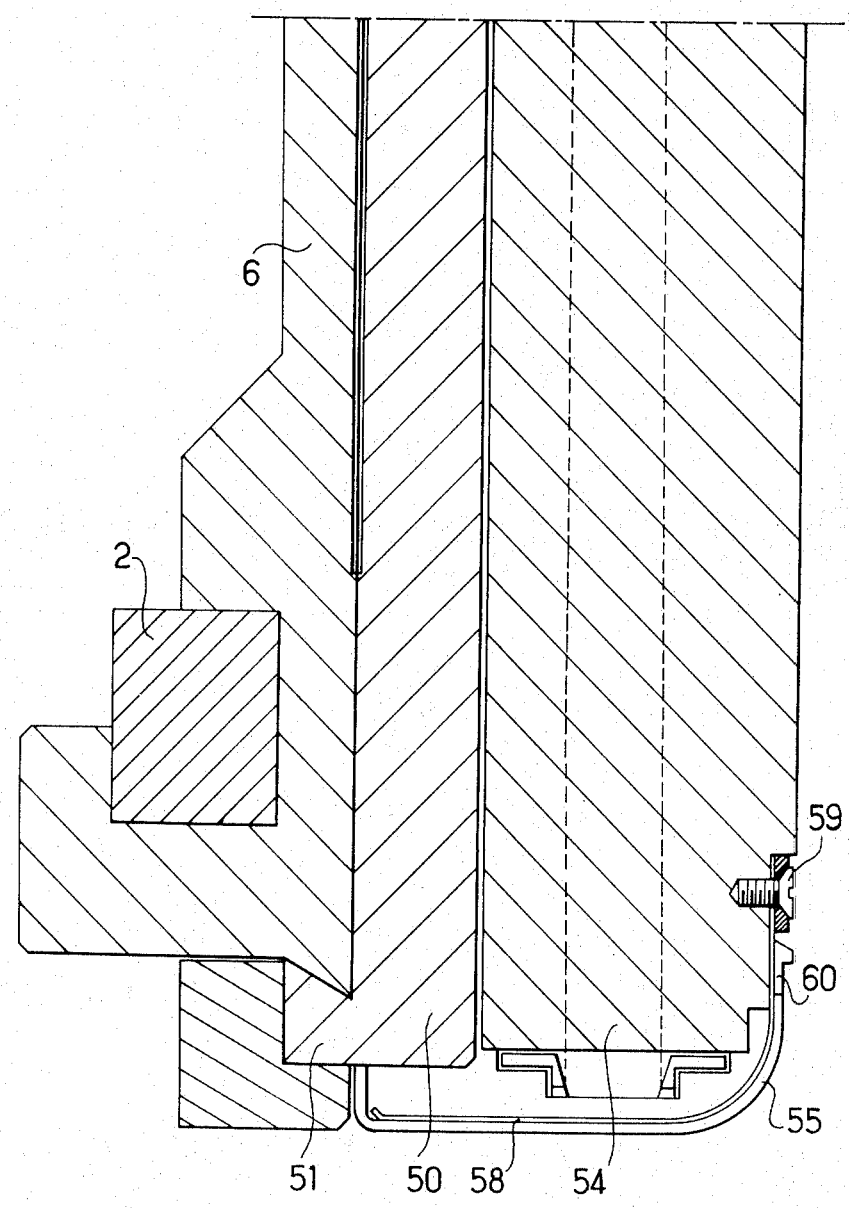

LATHE

BACKGROUND OF THE INVENTION

1. Field of the Invention

The present invention concerns an improved lathe.

2. Description of the Prior Art

The conventional lathe generally comprises a lathe bed mounting one or more tool-carrying carriages, the workpiece being fixed between a spindle carried in a headstock and a center mounted in a sleeve carried by a movable tailstock. These elements are generally mounted on a plinth or bedplate resting on the ground.

A disadvantage of the conventional lathe is that the possibilities for adapting it and modifying it to unusual applications are severely limited. The interchanging of the lathe elements and their arrangements in various combinations is generally difficult, if not impossible. Thus, the adaptation of a conventional lathe to a particular job to be done can involve drastic modifications, often at great expense.

A second disadvantage is that the axes of the spindle and center are subject to displacements, particularly with respect to the tool positions. Such displacements may be due to heating caused by the spindle rotation, or to heat coming from adjacent elements, for example. The precision of the work which may be carried out on such machines is therefore limited.

Conventional machines are generally mounted on a plinth resting on the ground, and associated elements such as hydraulic supplies, electrical equipment and so on are placed next to the plinth. The installation and handling of such machines poses difficulties, and the machine is very sensible to shocks and vibrations originating in the surroundings.

The conventional machines are fixed to the ground by means of a set of levelling concrete screws more than three in number. Their installation therefore poses problems, the adjustment of the levelling screws producing deformations in the machine, and these may vary with time.

In conventional machines, the number of tool-holding carriages which may be mounted is strictly limited, which produces a significant increase in the machining time for certain types of work.

These carriages are generally mounted on slideways without any form of protection against turnings, so that there is a risk that the carriages will become jammed by these turnings, particularly when workpieces in a hard metal are being treated.

SUMMARY OF THE INVENTION

In accordance with the present invention a lathe comprises a bedplate on which are mounted a lathe bed defining first and second slideways and a fixed headstock holding a rotatable spindle, a movable tailstock on at least one of the slideways, and means for maintaining the spindle axis in a first plane, the first and second slideways lying in a common second plane perpendicular to the first and being equally spaced from the first plane.

The invention will now be described in more detail, by way of example only and with reference to the accompanying diagrammatic drawings.

BRIEF DESCRIPTION OF THE DRAWINGS

FIG. 5 is a section through the carriage to a larger scale.

DESCRIPTION OF THE PREFERRED EMBODIMENT

Figure 1:
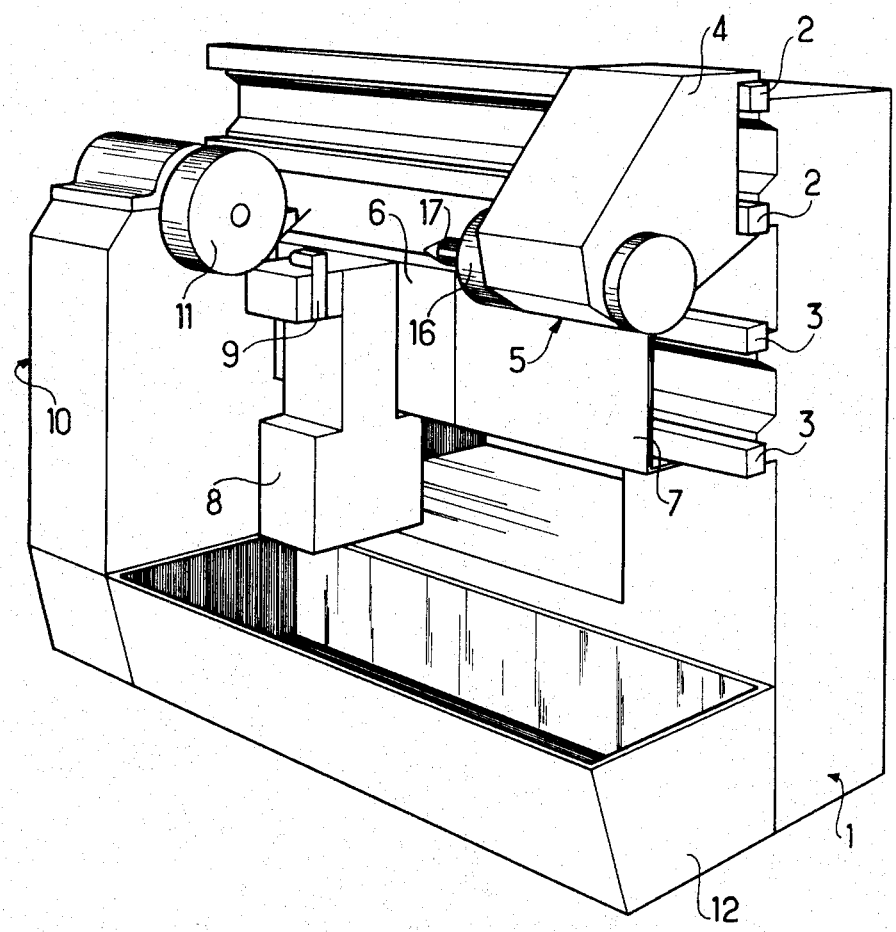
FIG. 1 is a perspective view of a lathe.

Referring to FIG. 1, the lathe includes a lathe bed 1 formed as a single casting and defining first and second pairs of slideways 2 and 3, hereinafter referred to as the upper and lower slideways respectively. Each slideway is defined by a pair of rails.

On the upper slideway 2 is mounted the movable tailstock 4 carrying the center assembly indicated generally at 5. This assembly 5 comprises the center sleeve 16 in which the center 17 is mounted.

A saddle 6 is mounted on the lower slideway 3, and carries a protective cover 7. On this saddle 6 is mounted a carriage 8 carrying a tool 9. The saddle 6 slides horizontally along the lower slideway 3, and the carriage 8 slides vertically on slideways formed on the saddle.

Attached to the lathe bed 1 is a headstock indicated generally at 10. This carries a spindle on which is mounted a chuck 11. This spindle and the center 17 are coaxial, their common axis lying in a horizontal first plane. The upper and lower slideways 2 and 3 lie in a common vertical second plane, and are equally spaced from the first plane.

Below the chuck 11 and center 17 is mounted a hopper 12 for the turnings produced during operation.

Figure 2:
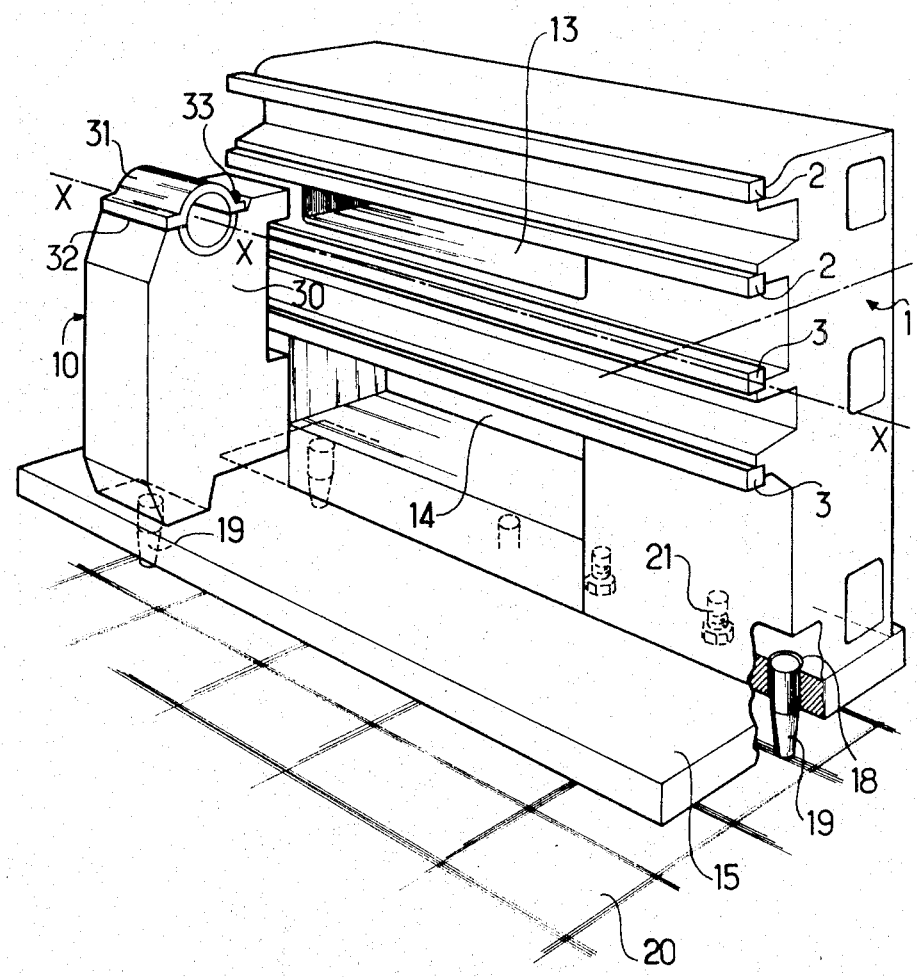
FIG. 2 is a similar view of the lathe, mounted on its bedplate and with certain elements removed.

Referring to FIG. 2, the lathe bed 1 is formed with a first aperture 13 between the upper and lower slideway 2 and 3. A second aperture 14 is formed below the lower slideway 3. The lathe bed 1 and the headstock 10 are mounted on a bedplate 15 in which are formed three substantially vertical bores 18. In each of these is located a respective peg or foot 19, each foot being longer than the bore 18 in which it is located, whereby the lathe rests on the ground on three points only.

The bedplate 15 is attached to the lathe bed 1 by means of bolts 21, and may therefore be used to mount various ancillary elements of the lathe, such as the motor and geared transmission, electrical equipment and so on. The bedplate also provides a support for the turnings hopper 12, which may be fixed to the bedplate and provided with means for automatically removing turnings from the hopper.

The headstock 10 comprises a base 30 on which is disposed one half of the bearing for the lathe spindle. The upper half of this bearing is defined by a spindle mount 31, the bearing being divided in the plane containing the axis X—X of the spindle and center. The mount 31 is bolted to the support 30 along one side only, by means of bolts 33, to allow free lateral expansion. The base 30 and mount 31 are separated by a layer 32 of thermally insulative material.

This arrangement of the headstock provides a free play for the expansions and contractions due to rotation of the spindle, the axis X—X remaining always in the first plane, that of the layer 32.

The lathe elements so far mentioned are interchangeable, and lead to various possible combinations. For example, the headstock 10 may be mounted at either the left-hand or the right-hand end of the lathe bed 1. If required, two headstocks may be attached to the same lathe bed. The lathe spindle may be mounted in the headstock so as to face in either direction, as may the center 17 in the tailstock. The tailstock may be mounted on either the upper slideway 2 or the lower slideway 3 the pairs of slideways being symmetrical relative to the plane passing through the headstock spindle axis.

The saddle 6 may be mounted on either slideway, and may carry more than one carriage. Further saddles may be mounted on the same slideway, or saddles may be mounted on both slideways, each with the appropriate number of carriages to carry out any particular type of work.

A single saddle may be mounted on both slideways 2 and 3, carrying one or more carriages.

The upper aperture 13 may house one or more tool-carrying carriages mounted on guide strips (not shown) formed on the lathe bed 1. The aperture 13 may also house handling means for the workpieces, particularly where a row of similar lathes are arranged in a production line.

The lower aperture 14 may house a copying device, of any suitable known type.

The lathe just described is highly adaptable, permitting numerous kinds of work to be carried out. For example, a saddle 6 may be mounted on each of the slideways 2 and 3, each with one tool-carrying carriage. A third carriage may be mounted in the upper aperture 13, so that a cylindrical workpiece may be attached at each of three generatrices separated by 90°.

With the tailstock removed from the lathe bed 1, a saddle may be mounted on slideways 2 and 3 carrying a single tool-holding carriage with which the ends of a workpiece held in the chuck 11 may be treated.

Figure 3:
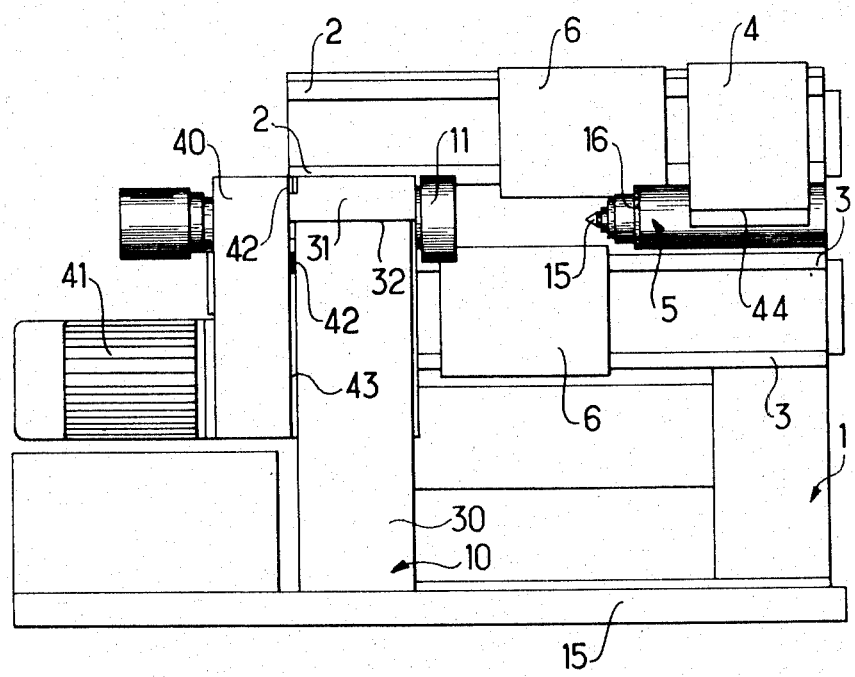
FIG. 3 is a front elevation of the lathe.

FIG. 3 is a front elevation of the lathe, showing the elements so far described, a saddle 6 being mounted on each of the slideways 2 and 3. FIG. 3 also shows the geared transmission 40 and the electric motor 41 with which the lathe spindle is driven. The motor and transmission assembly may be mounted on either side of the headstock 10, depending on which end of the lathe bed 1 the headstock is mounted.

The motor and transmission assembly is attached to the headstock, by bolts 42 for example, so as to leave a thermally-insulative space 43 between them, the number of points of contact being reduced to a minimum. The transfer of heat between the motor and transmission and the headstock is thus reduced to a very low value, aiding maintenance of the axis X—X in the first plane.

The sleeve 16 is held in the headstock 4 in a bearing divided in the first plane. A layer of thermally insulative material 44 is located between the bearing parts, serving the same function as the layer 32 in the headstock 10.

Figure 4A:
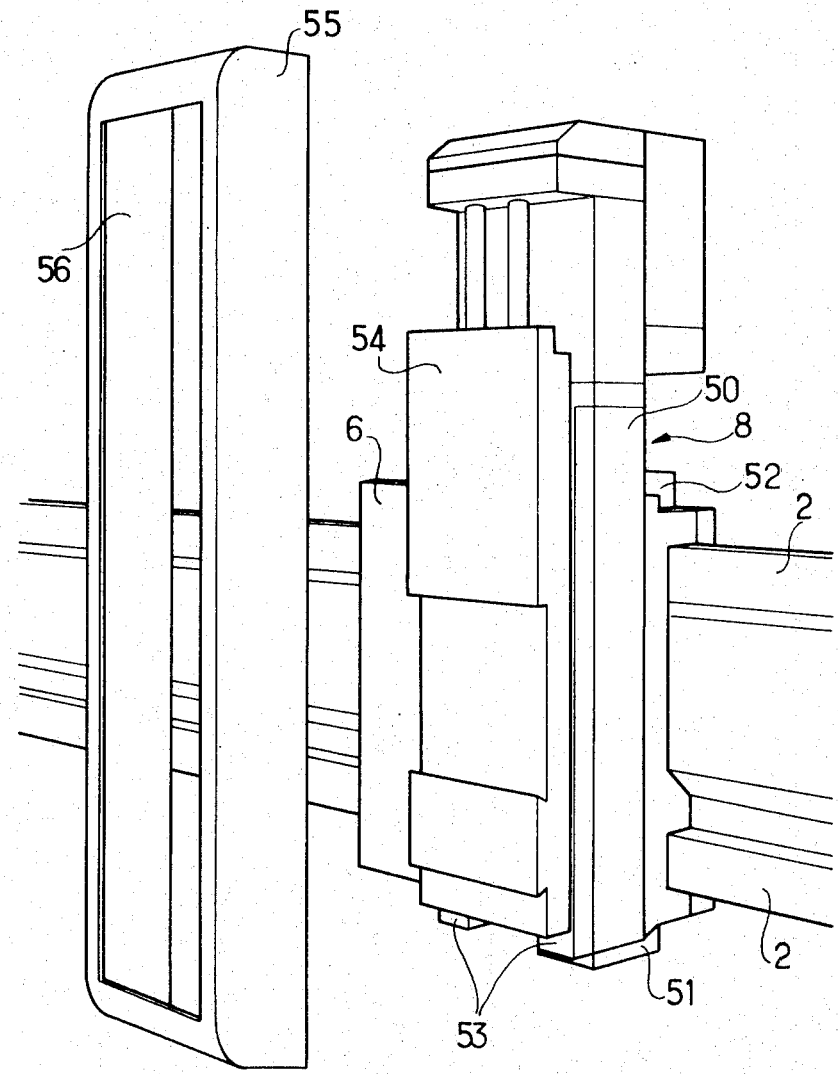
FIGS. 4a and 4b show a tool-holding carriage of the lathe.

Referring to FIG. 4a, the saddle 6 carried on the slideway 2 mounts a tool-carrying carriage indicated generally at 8. This comprises a fixed part 50 attached to the saddle 6 by means of a dovetail joint 51 at one end and an L-shaped flange 52 at its other end. This fixed portion 50 defines slideways 53 on which is mounted a movable portion 54 of the carriage. An apertured protective cover 55 is attached to the carriage 8, the aperture 56 allowing free movement of the movable carriage portion 54 along the slideways 53.

Figure 4B:
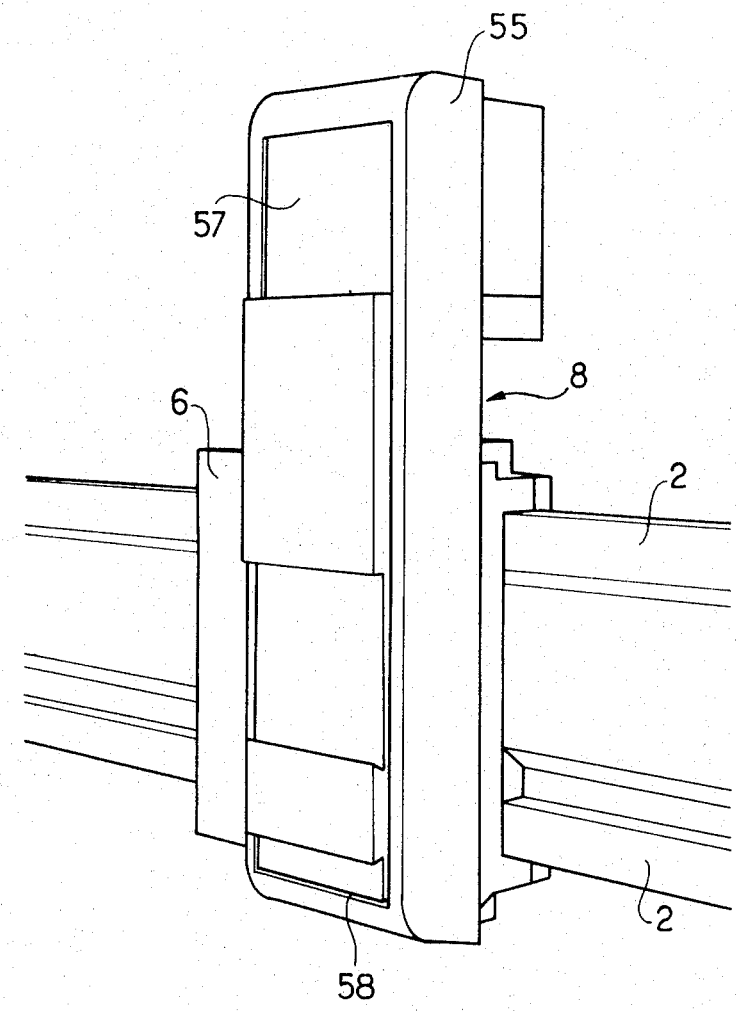

FIG. 4b shows the cover 55 in place on the carriage 8, and also shows two sheets of foil, 57 and 58 respectively, each fixed at one end to one end of the movable carriage portion 54. These sheets of foil slide freely within the cover 55, and are so arranged that the aperture 56 is always obscured, so preventing entry of turnings into the cover, and avoiding the risk that the movable carriage portion 54 will be jammed on its slideways 53 by such turnings. FIG. 5 is a section through the lower part of the carriage 8, showing the disposition of the foil sheets.

The lower foil sheet 58 is attached at its upper end to the lower end of the movable carriage portion 54, by screws 59. The foil sheet rests freely inside the cover 55, and it will be seen that as the movable carriage portion is raised from its lowermost position (that shown in the Figure), the foil sheet will be raised to continuously obscure the lower part of the aperture 56. A turnings ejector 60 is fitted to the lower end of the aperture 56, so that no turnings may fall onto and remain on the rim of the aperture.

What is claimed is:
1. A lathe comprising:
   a bedplate,
   a lathe bed mounted on said bedplate defining first and second pairs of slideways,
   a fixed headstock attached to said lathe bed and holding a rotatable spindle,
   a movable tailstock on one of the pairs of slideways,
   means for maintaining the spindle axis in a first plane,
   and said first and second pairs of slideways lying in a common second plane perpendicular to the first plane and being equally spaced from the first plane and being symmetrical to permit said tailstock to be interchangeably carried by either pairs of slideways.

2. A lathe as claimed in claim 1, wherein: the lathe bed is formed with a first aperture between the first and second pairs of slideways.

3. A lathe as claimed in claim 2, wherein: the first aperture houses at least one carriage.

4. A lathe as claimed in claim 2, wherein: the first aperture houses at least one device for handling workpieces of the lathe.

5. A lathe as claimed in claim 1, wherein: the headstock bearing for the spindle is split in the first plane and the means for maintaining the spindle axis in the first plane comprises a layer of thermally-insulative material between the bearing segments.

6. A lathe as claimed in claim 4, wherein: the headstock bearing for the spindle is split in the first plane and the means for maintaining the spindle axis in the first plane comprises a layer of thermally insulative material between the bearing segments.

7. A lathe as claimed in claim 1, wherein: a sleeve is mounted within the tailstock and carries a center coaxial with the spindle, and said lathe further includes means for maintaining the center axis in the first plane.

8. A lathe as claimed in claim 7, wherein: the sleeve mounting is divided in the first plane and the means for maintaining the center axis in the first plane comprises a layer of thermally insulative material between the sleeve mounting sections.

9. A lathe as claimed in claim 2, wherein the lathe bed is formed with a second aperture on that side of the one pair of slideways remote from the first aperture.

10. A lathe as claimed in claim 9, wherein: the second aperture accommodates a copying device.

11. A lathe as claimed in claim 1, including at least one saddle mounted on at least one of the slideways and at least one carriage mounted on each saddle, and wherein each set of carriage slideways is protected from the lathe turnings by a sheet of foil attached at one of its ends to each end of the respective carriage.

12. A lathe as claimed in claim 11, wherein each carriage is provided with an apertured protective cover, the sheets of foil at each end of the carriage sliding freely within the cover.

13. A lathe as claimed in claim 1, including three bores in the bedplate housing respective feet on which the lathe bed and headstock are supported.

14. A lathe as claimed in claim 13, wherein the bedplate is attached to the lathe bed by means of bolts.

15. A lathe as claimed in claim 13, wherein the length of the feet exceeds the thickness of the bedplate.

16. A lathe as claimed in claim 1, wherein the means of mounting the lathe bed and headstock on the bedplate are so arranged that the headstock may be mounted at the right-hand or left-hand end of the lathe bed.

17. A lathe as claimed in claim 16, in which the means of mounting the spindle on the headstock allow the spindle to face either way on the headstock.

18. A lathe as claimed in claim 16, wherein the means of mounting the center in the tailstock allow the center to face either way in the tailstock.

19. The lathe as claimed in claim 16, further including a motor and geared transmission for driving the spindle and means for mounting the motor and transmission on either side of the headstock.

20. A lathe as claimed in claim 19, wherein the motor and transmission are mounted on the headstock in such a way as to reduce the area of contact therebetween to a minimum.

21. A lathe as claimed in claim 20, wherein a thermally-insulative space is provided between the motor and transmission assembly and the headstock.

* * * * *